No. 867,360. PATENTED OCT. 1, 1907.
J. A. HARALSON.
ORE SEPARATOR.
APPLICATION FILED JAN. 24, 1907.
2 SHEETS—SHEET 1.
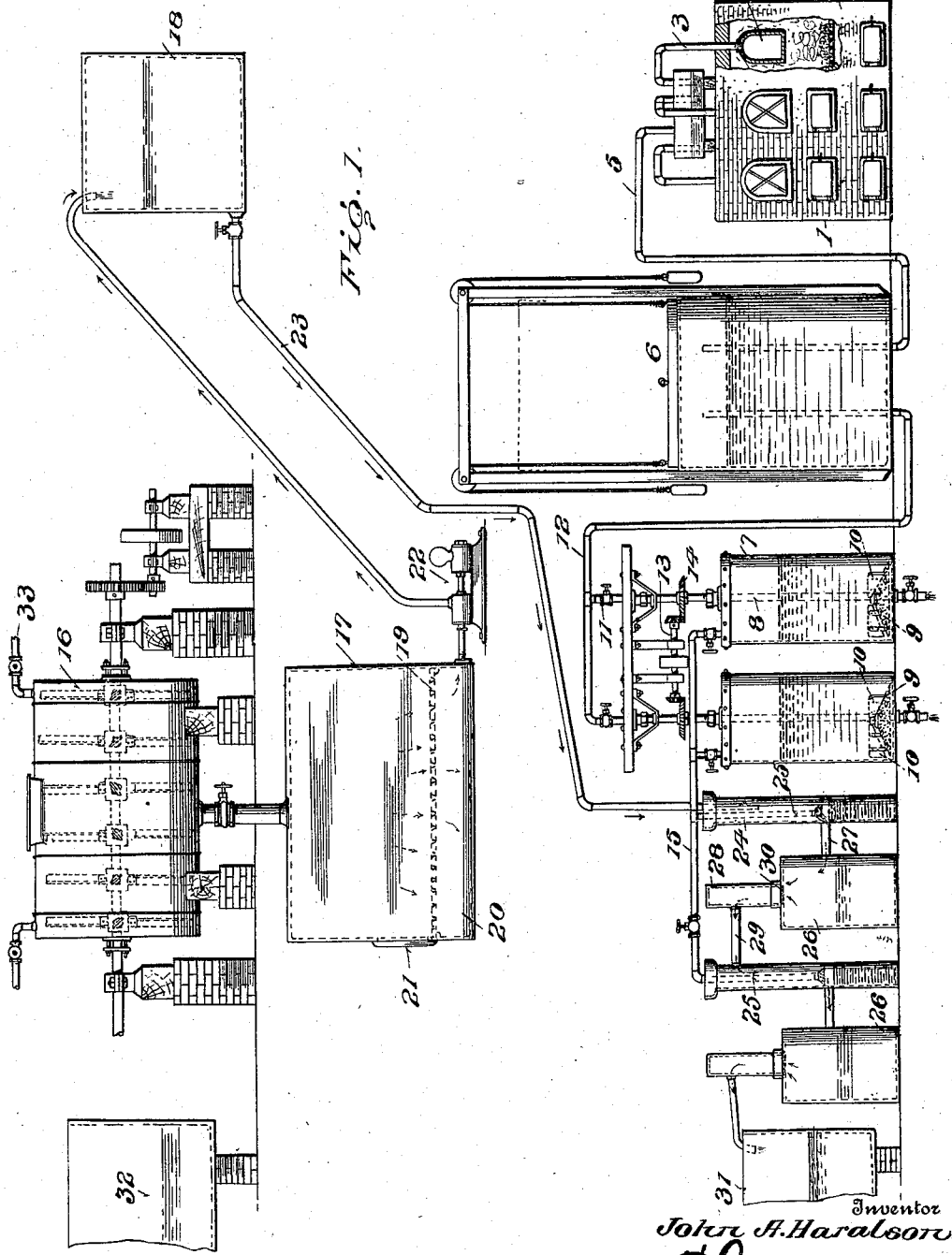
Inventor
John A. Haralson.
Witnesses
By
Attorneys

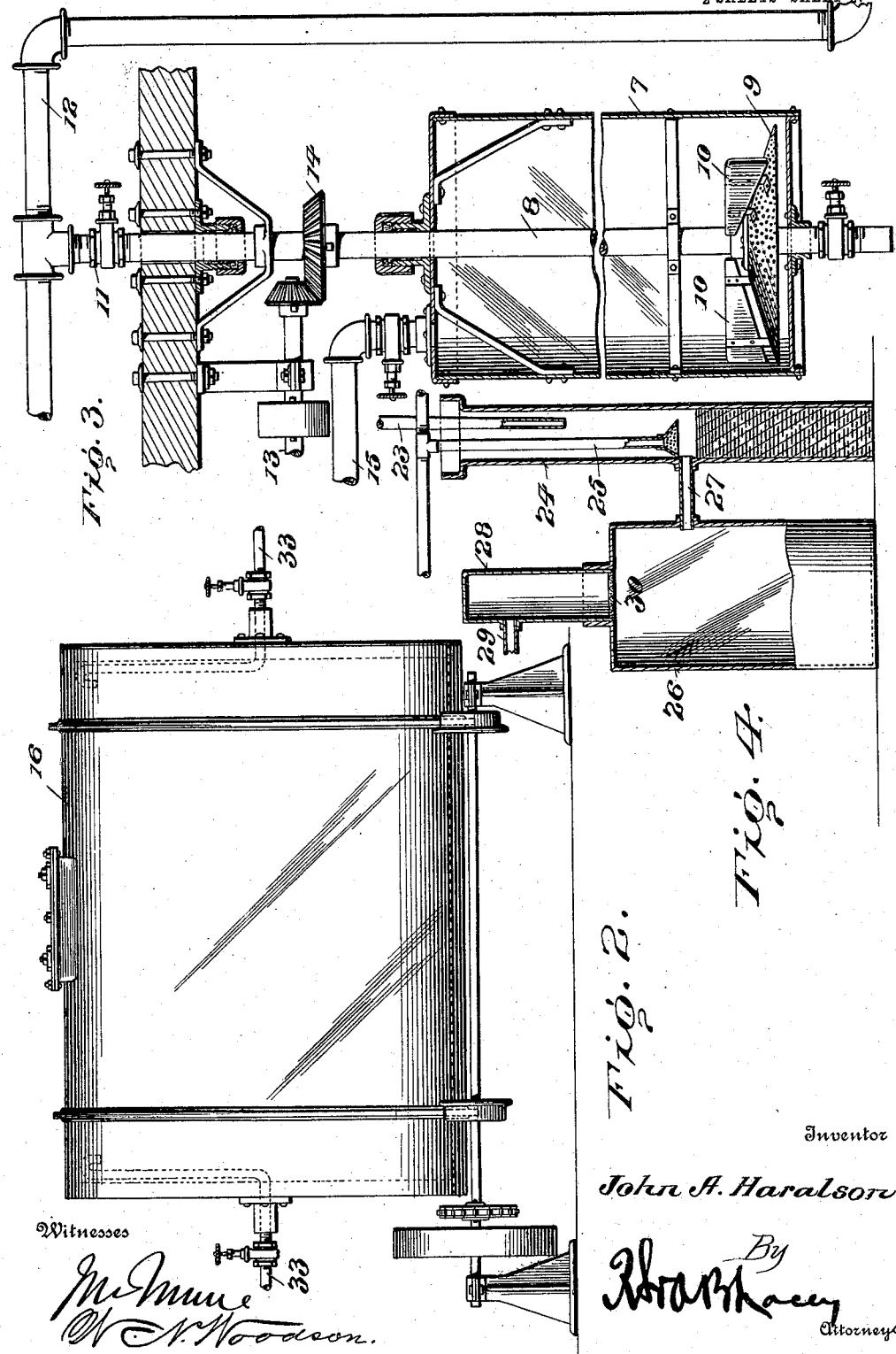

UNITED STATES PATENT OFFICE.

JOHN A. HARALSON, OF MEXICO, MEXICO.

ORE-SEPARATOR.

No. 867,360.  Specification of Letters Patent.  Patented Oct. 1, 1907.

Application filed January 24, 1907. Serial No. 353,861.

*To all whom it may concern:*

Be it known that I, JOHN A. HARALSON, a citizen of the United States, residing at the City of Mexico, Mexico, have invented certain new and useful Improvements in Ore-Separators, of which the following is a specification.

This invention relates to apparatus for extracting metals from ore by the process of leaching and precipitation, being especially adapted for the collection of copper.

The invention admits of copper being separated from ore containing a comparatively small percentage of the metal, on a paying basis and prevents waste since the solution is regenerated and used again and all fumes and gases utilized in an economical and advantageous way.

The invention consists of apparatus for mixing crushed ore with a solution of a nature to dissolve the metal therefrom to be collected, a filter for separating the metalliferous solution from the solid matter, such as sand, earth, mineral and the like, a retort for generating hydrogen sulfid gas and burning materials, such as gypsum and charcoal for making calcium sulfid, a hydrogen sulfid gas generator utilizing the carbon dioxid produced in the retort, a mixer for combining the metalliferous solution and hydrogen sulfid gas, and a separator in which the metal precipitates, there being as many mixers and separators as may be found necessary, the solution from the last separator containing an excess of metal so as not to affect the solution admitted into the ore mixer in a cycle of operation.

In the drawings forming a part of the specifications: Figure 1 is a diagrammatical view of the several devices assembled for carrying out the separation of the ore in a cycle of operation. Fig. 2 is a detail view of a rotary mixer. Fig. 3 is a detail view of a hydrogen sulfid gas generator. Fig. 4 is a detail view of a mixer and a separator in which the precipitation is effected.

Corresponding and like parts are referred to in the following description and indicated in all the views of the drawings by the same reference characters.

The furnace 1 is preferably of the battery type and embodies a series of retorts 2 in which the material is burned, or roasted, to form calcium sulfid, the carbon dioxid gas evolved being subsequently employed to form hydrogen sulfid gas which combines with the metalliferous solution to effect separation and precipitation of the metal therefrom.

A pipe 3 leads from each retort 2 and dips into water contained in a box, or receptacle 4, constituting in effect a header from which a pipe 5 extends to convey the carbon dioxid gas to a gasometer 6 of any variety and in which the gas accumulates, or is stored. Gypsum and charcoal mixed in the proportions of about two to one, are placed in the retorts and are converted into calcium sulfid which is subsequently used in the generator for producing hydrogen sulfid gas.

Any number of hydrogen sulfid gas generators may be provided, two being shown, and each being a counterpart of the other. Each generator consists of a tank 7 in which a quantity of water is placed. A hollow shaft 8 extends into the tank and is provided at its lower end with a distributer 9 and a series of plates 10, the latter acting as agitators to keep the calcium sulfid suspended in the water, whereas the distributer 9 causes the carbon dioxid gas entering through the shaft 8 to pass upward through every part of the mixer. The hollow shafts 8 are coupled to extensions 11 of a pipe 12 which leads from the gasometer, the coupling between the parts 8 and 11 being such as to maintain a tight joint, while at the same time admitting of the shafts having free rotation.

Any means may be employed for rotating the shafts 8 and, as shown, a counter-shaft 13 is adapted to be driven from a suitable source of power and is connected by a bevel gearing 14 with each shaft 8. A pipe 15 has connection with each generator 7 and conveys the hydrogen sulfid gas therefrom to one or more mixers to combine with the metalliferous solution and effect separation of the metal therefrom.

An ore mixer 16 is adapted to receive the crushed ore and the liquid solvent for the metal to be separated, and which solvent consists of a weak solution of sulfuric acid should the metal collected be copper. After the crushed ore and liquid solvent have been placed in the mixer 16, they are thoroughly agitated in any well known manner as by rotating the agitator arranged therein. After the ore has been treated in the mixer to effect dissolution of the metal, the mass is discharged from the mixer into a filter, or separator 17, which catches the soild matter and permits the metalliferous solution to filter therethrough and be pumped into a tank or receptacle. The filter 17 consists of a box, tank, or like receptacle having a false bottom 19 which is perforated and covered with textile, such as gunny sacks, cotton, or the like to catch sand, earthy matter and the crushed ore and permit the solution to pass therethrough into the space 20 formed between the bottom of the filter and the false bottom 19.

After separation of the metalliferous liquid from the solid matter has been effected, the accumulation upon the false bottom 19 is removed, preferably through a man-hole 21 in a side of the box, or receptacle 17. The metalliferous solution is forced into the tank 18 by means of a pump 22, or other liquid elevating contrivance.

The metalliferous solution passes from the tank 18 through a pipe 23 into a mixer 24, the same consisting of a pipe, or narrow receptacle. As the solution is supplied to the mixer 24, it comes in contact with the hydrogen sulfid escaping from a branch of pipe 15 and the gas combined with the metal contained in the solution forms a copper sulfid which being heavier than the solution, precipitates. A separator 26 receives the metalliferous solution from the mixer after the hydrogen sulfid gas has been caused to commingle therewith, and the copper sulfid precipitates and collects in the bottom of the separator and is removed therefrom from time to time.

A pipe 27 connects the mixer 24 with the separator 26. A pipe 28 projects vertically from the top of the separator 26 and is connected by a lateral pipe 29 with a second mixer similar in construction and operation to the mixer hereinbefore described. A screen, or filter 30, located at the lower end of the pipe 28 catches the copper sulfid and prevents the same passing upward into the second mixer of the series. There may be as many mixers and separators as may be found necessary to effect a thorough separation of the metal to be collected, it being highly important that the solution passing from the last separator, contain a small percentage of copper or metal in solution so as not to affect the initial mixing of the ore and solvent solution in the mixer 16. The copper sulfid removed from the separator 26 is roasted, or retorted, and the sulfurous fumes driven off are collected and combined with water to form sulfurous acid which is added to the solution used in the ore mixer so as to maintain the proper strength thereof.

By having a series or battery of hydrogen sulfid gas generators, one or more may be thrown out of action to admit of removal of the spent calcium sulfid therefrom and replenishing and recharging thereof without destroying the continuous operation of the apparatus. Valves are provided and arranged to admit of cutting off any one or more of the generators as may be required. While the solution may pass through the series of separators 26, nevertheless, the hydrogen sulfid gas may be admitted in regulated quantity to one or more of the mixers 24, care being taken not to surcharge the metalliferous solution so that when passing from the last separator it will contain an excess of such gas, which would detract from the solvent properties of the solution when added to the ore mixer 16. The solution passing off from the last separator 26 is discharged into a tank 31 and is regenerated by addition thereto of sulfuric acid until the required strength is obtained. The tank 31 is utilized for mixing the solution, and when prepared, said solution is conveyed to a reservoir tank 32 from which it is drawn into the ore mixer 16.

The treating of the ore in the mixer 16 produces a gas which must be carried off to relieve internal pressure, and for this purpose, one or more vents 33 are provided. While the gas may be conveyed to a suitable point and discharged, however, it is preferred to utilize same and to discharge it into the gasometer.

It is to be understood that the menstruum employed in the mixer to produce the metalliferous solution will depend upon the nature of the ore and the metal to be separated therefrom. When the metal to be collected is copper, the menstruum will consist of a weak solution of sulfuric acid.

If the solution discharged from the last separator contained free hydrogen sulfid gas, the latter would combine with a portion of the metal dissolved from the ore in the ore mixer and precipitate the same as a metal sulfid which would be lost; hence the importance of regulating the separation so that the sulfid discharged from the last separator shall contain a slight percentage of metals.

Having thus described the invention, what is claimed as new is:

1. Apparatus for precipitating metals from solutions, the same comprising a retort for generating gas, a gasometer for storing the gas as produced, a generator containing water and the material previously retorted, means for supplying gas from the retort to the generator and agitating the solution therein, a mixer, means for supplying metalliferous solution and the gas from the generator to the mixer in regulable quantity, and a separator receiving the metalliferous solution impregnated with the gas from the mixer to effect separation of the metal by precipitation.

2. In apparatus for precipitating metals from solutions, the combination of a series of separators, a corresponding series of mixers, the separators discharging into the mixers and the latter in turn discharging into the successive separators, a main pipe for supplying gas to each of the mixers, branch pipes leading from the main pipe to each of the mixers, valves for regulating the supply of gas to the mixers and admitting of one being cut off from a supply of gas, and means for supplying a metalliferous solution to the first mixer.

3. In apparatus for precipitating metals from solutions, the combination of a mixer, a separator in communication with the mixer, a pipe rising from the separator, a filter at the lower end of said pipe, a second mixer in communication with the pipe of the first separator, a second separator in communication with the second mixer, means for supplying a metalliferous solution to the first mixer and a pipe for supplying gas to each of the mixers to effect chemical combination of the gas with the metal held in solution.

In testimony whereof I affix my signature in presence of two witnesses.

JOHN A. HARALSON. [L. S.]

Witnesses:
V. B. HILLYARD,
H. S. HILL.